United States Patent
Boehme

(10) Patent No.: US 7,372,010 B1
(45) Date of Patent: May 13, 2008

(54) COMBINATION SOCKET AND PHOTOSENSOR FOR MEASURING AND ADJUSTING INTENSITY OF LAMP IN THE SOCKET

(76) Inventor: Hilary Boehme, 375 Marcus Blvd., Hauppauge, NY (US) 11788

( * ) Notice: Subject to any disclaimer, the term of this patent is extended or adjusted under 35 U.S.C. 154(b) by 0 days.

(21) Appl. No.: 10/987,516

(22) Filed: Nov. 12, 2004

(51) Int. Cl.
*G01J 1/32* (2006.01)
(52) U.S. Cl. ...................... 250/205; 250/239
(58) Field of Classification Search ............... 250/205, 250/214 R, 221, 239, 214.1
See application file for complete search history.

(56) References Cited

U.S. PATENT DOCUMENTS

| | | |
|---|---|---|
| 5,130,776 A | 7/1992 | Popovic |
| 5,497,004 A | 3/1996 | Rudolph et al. |
| 6,057,917 A | 5/2000 | Petersen et al. |
| 6,160,352 A * | 12/2000 | Steinel ................. 315/156 |
| 6,278,120 B1 | 8/2001 | May |
| 6,313,638 B1 | 11/2001 | Sun et al. |
| 6,541,777 B1 | 4/2003 | Lombardo et al. |
| 6,580,221 B2 * | 6/2003 | Hutzler et al. ............. 315/149 |
| 6,773,608 B1 | 8/2004 | Hallett et al. |
| 2002/0162970 A1 | 11/2002 | Sasges |

* cited by examiner

*Primary Examiner*—Que T. Le

(57) ABSTRACT

A combination socket and photosensor for measuring and adjusting intensity of a lamp in the socket of the combination socket and photosensor. A socket receives and electrically communicates with the lamp. A photosensor is operatively connected to the socket and measures the intensity of the lamp. A controller electrically communicates with the lamp and the photosensor and contains a feed back loop. The feed back loop electrically communicates with the photosensor and the lamp and compares the intensity of the lamp to a predetermined value and adjusts the intensity of the lamp accordingly.

11 Claims, 1 Drawing Sheet

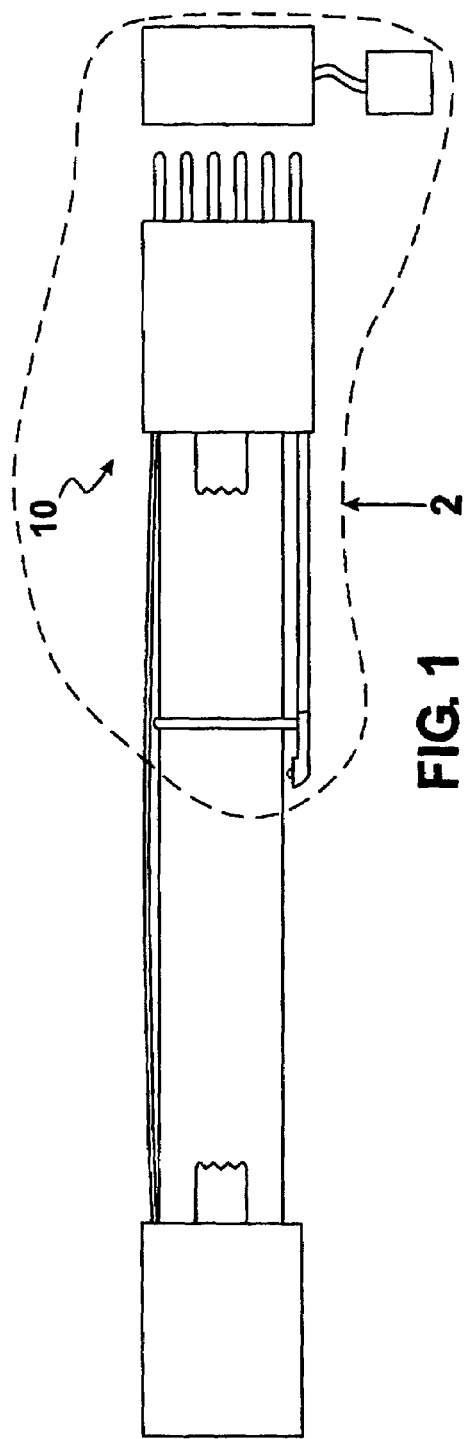
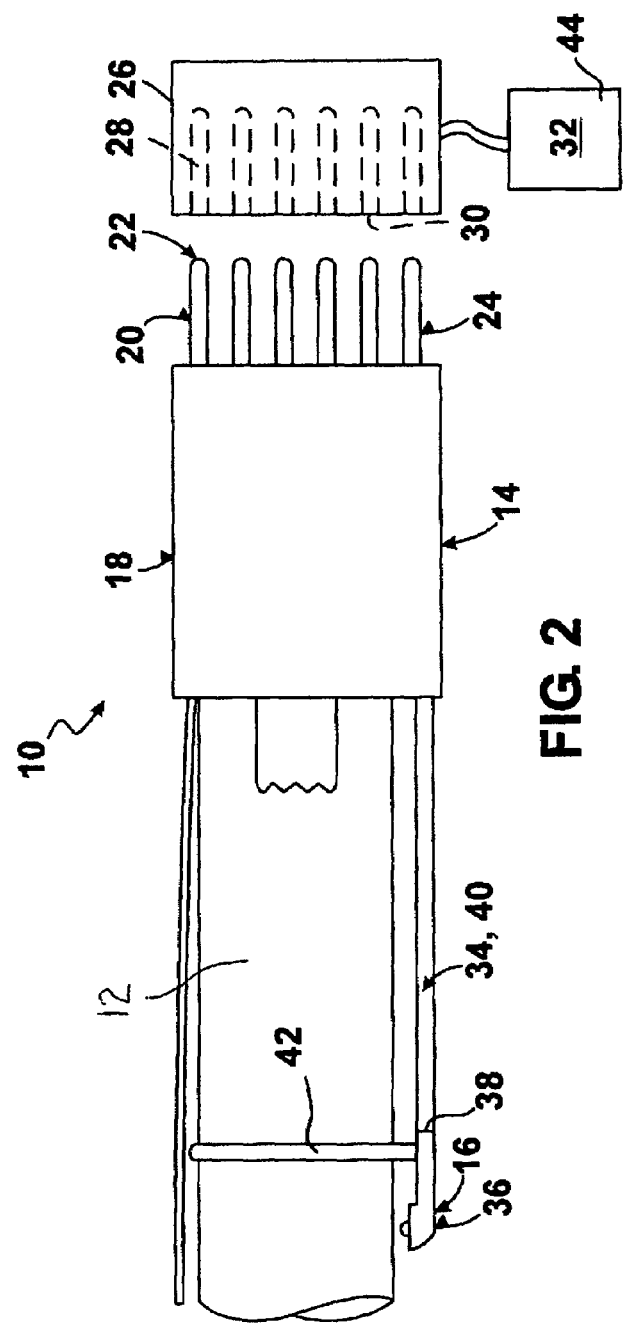

COMBINATION SOCKET AND PHOTOSENSOR FOR MEASURING AND ADJUSTING INTENSITY OF LAMP IN THE SOCKET

BACKGROUND OF THE INVENTION

1. Field of the Invention

The present invention relates to a socket for a lamp, and more particularly, the present invention relates to a combination socket and photosensor for measuring and adjusting intensity of a lamp in the socket.

2. Description of the Prior Art

FOR EXAMPLE, U.S. Pat. No. 5,130,776 to Popovic teaches an ultraviolet-light sensitive photodiode device that comprises a first semiconductor photodiode for producing a first current when illuminated by light and a second semiconductor photodiode for producing a second current when illuminated by light. The first and second photodiodes are electrically connected to produce a signal proportional to the difference between the first and second currents. The first and second photodiodes are substantially equal in sensitivity to visible and infrared light, while the first photodiode is more sensitive to ultraviolet light than the second photodiode. Thus, the photosensitive device resulting from connecting the two photodiodes has a spectrally narrow sensitivity to ultraviolet light.

ANOTHER EXAMPLE, U.S. Pat. No. 5,497,004 to Rudolph et al. teaches an UV sensor having a photodetector for measurement of UV radiation, an SiO.sub.2-containing dispersive element disposed ahead of the photodetector in the direction of incident UV radiation and an optional housing having an entry opening for UV radiation. The dispersive element contains quartz glass with interiorly disposed boundary surfaces, the orientations of which are statistically homogeneously distributed.

STILL ANOTHER EXAMPLE, U.S. Pat. No. 6,057,917 to Petersen et al. teaches an ultra violet light sterilizing apparatus utilizing a silicon carbide (SiC) photodiode sensor. The ultraviolet light fluid sterilization apparatus includes a fluid chamber, at least one ultraviolet light source configured to emit ultraviolet light into the fluid chamber, and at least one ultraviolet light sensor that includes a silicon carbide photodiode. Each UV light sensor includes a sealed outer housing having an optically transparent window. A silicon carbide photodiode is located inside the housing adjacent the transparent window. Each UV light sensor also includes a signal amplification unit that includes an amplifier mounted on a printed circuit board located inside the housing. The UV sterilization apparatus also includes a controller configured to receive, as input, a signal from each ultraviolet light sensor. The controller compares the input signal to a desired UV light intensity and outputs a control signal to each ultraviolet light source to adjust the intensity of the ultraviolet light emitted from each ultraviolet light source.

YET ANOTHER EXAMPLE, U.S. Pat. No. 6,278,120 to May teaches a UV sensor design which virtually eliminates solarization effects on optical components and photodetector and is effective for both broad area and collimated light sources. The sensor design reduces the number of photons striking a unit area of any of the materials in the light path sensitive to UV light to a level which does not produce appreciable solarization over very long periods of time. The UV sensor has as the first optical element in the viewing path a UV transmitting, extremely low solarization window. The back surface of this window is frosted to produce some diffusion of the UV rays. A small metal disc with a very small aperture is the next optical element and reduces the total amount of energy admitted to the optical measurement system. A second frosted UV transmitting, extremely low solarization window further diffuses the light beam passing through the aperture. The UV light from this second window travels toward to two UV filters and is further dispersed to produce low intensity level UV light which impinges on a silicon photodetector.

STILL YET ANOTHER EXAMPLE, U.S. Pat. No. 6,313,638 to Sun et al. teaches a dual-channel photo-ionization detector (PID) and a method for calculating the gas concentration in the PID. The PID includes a UV light source which produces a UV light to ionize a gas, first and second identical ion detectors for measuring first and second currents including ion, and a UV shield which differentially shields the ion detectors from the UV light. The differential shielding of the ion detectors enables the PID to differentiate between current caused by ions and current caused by the photoelectric effect of the UV light. The detector measures a concentration of the gas irrespective of a variation of an intensity of the UV light. A heater in the PID stabilizes the temperature for measurements and prevents condensation in the PID. The method includes: shielding the first ion detector from the UV light and exposing the second ion detector to the UV light; and deciding the concentration of the ionizable gases independent of an intensity of the UV light by comparing the first and second currents. In addition, the calculation of the gas concentration independent of the UV light intensity and a self-cleaning capability of the PID promote a construction of an integrated PID sensor module which is sealed to prevent a user from opening the sensor module. The sensor module, including the UV light source, the ion sensors and the UV shield in a single housing, easily plugs into the socket in a structure including the remainder PID.

YET STILL ANOTHER EXAMPLE, U.S. Pat. No. 6,541,777 to Lombardo et al. teaches an ultra violet light sterilizing apparatus that includes in one embodiment a fluid chamber, at least one ultraviolet light source configured to emit ultraviolet light into the fluid chamber, and at least one ultraviolet light sensor that includes a photodiode. The photodiode is a silicon carbide photodiode, a gallium nitride photodiode, or an aluminum gallium nitride photodiode. Each UV light sensor includes a sealed outer housing having an optically transparent window. The photodiode is located inside the housing adjacent the transparent window. Each UV light sensor also includes a signal amplification unit that includes an amplifier mounted on a printed circuit board located inside the housing. The UV sterilization apparatus also includes a controller configured to receive, as input, a signal from each ultraviolet light sensor. The controller compares the input signal to a desired UV light intensity and outputs a control signal to each ultraviolet light source to adjust the intensity of the ultraviolet light emitted from each ultraviolet light source.

STILL YET ANOTHER EXAMPLE, U.S. Pat. No. 6,773,608 to Hallett et al. teaches a process for treating an aqueous liquid. The process includes: passing the liquid by force of gravity through a treatment area, the liquid having an upper surface exposed to ambient pressure; disrupting the flow of the liquid as it passes through the treatment area, and exposing the upper surface of the liquid as the flow is disrupted to UV light. Disrupting the flow includes directing lower portions of the liquid toward the surface of the liquid to bring such portions into contact with UV light. A process for treating an aqueous liquid in which the treatment process is monitored. This process includes passing the liquid through a treatment area to bring the liquid into contact with reflective walls submerged below an upper surface of the liquid, and exposing the upper surface of the liquid to light emitted from a UV light source such that UV light penetrates the liquid to strike the submerged reflective surfaces and to be reflected therefrom to emerge through the upper surface of the liquid. The process also involves determining the intensity of the UV light emitted from the light source, determining the intensity of UV light received by a UV light sensor trained to receive emergent light and determining whether the treatment has a predetermined effectiveness based on the intensity of the UV light emitted from the light source and the intensity of the UV light received by the sensor. Apparatuses for carrying out processes of the invention are also described.

YET STILL ANOTHER EXAMPLE, United States Patent Application Number 20020162970 teaches an ultra violet light sterilizing apparatus utilizing a silicon carbide (SiC) photodiode sensor. The ultraviolet light fluid sterilization apparatus includes a fluid chamber, at least one ultraviolet light source configured to emit ultraviolet light into the fluid chamber, and at least one ultraviolet light sensor that includes a silicon carbide photodiode. Each UV light sensor includes a sealed outer housing having an optically transparent window. A silicon carbide photodiode is located inside the housing adjacent the transparent window. Each UV light sensor also includes a signal amplification unit that includes an amplifier mounted on a printed circuit board located inside the housing. The UV sterilization apparatus also includes a controller configured to receive, as input, a signal from each ultraviolet light sensor. The controller compares the input signal to a desired UV light intensity and outputs a control signal to each ultraviolet light source to adjust the, intensity of the ultraviolet light emitted from each ultraviolet light source.

SUMMARY OF THE INVENTION

ACCORDINGLY, AN OBJECT of the present invention is to provide a combination socket and photosensor for measuring and adjusting intensity of a lamp in the socket that avoids the disadvantages of the prior art.

ANOTHER OBJECT of the present invention is to provide a combination socket and photosensor for measuring and adjusting intensity of a lamp in the socket that is simple to use.

BRIEFLY STATED, STILL ANOTHER OBJECT of the present invention is to provide a combination socket and photosensor for measuring and adjusting intensity of a lamp in the socket of the combination socket and photosensor. A socket receives and electrically communicates with the lamp. A photosensor is operatively connected to the socket and measures the intensity of the lamp. A controller electrically communicates with the lamp and the photosensor and contains a feed back loop. The feed back loop electrically communicates with the photosensor and the lamp and compares the intensity of the lamp to a predetermined value and adjusts the intensity of the lamp accordingly.

BRIEF DESCRIPTION OF THE DRAWING

The figures are briefly described as follows:

FIG. 1 is a diagrammatic side elevational view of the combination socket and photosensor of the present invention measuring and adjusting intensity of a lamp in the socket; and FIG. 2 is an enlarged diagrammatic side elevational view of the area generally enclosed by the dotted curve identified by ARROW 2 in FIG. 1 of the combination socket and photosensor of the present invention.

LIST OF REFERENCE NUMERALS UTILIZED IN THE DRAWING 10 combination socket and photosensor of present invention for measuring and adjusting intensity of lamp 12 in socket of combination socket and photosensor 10
12 lamp
14 socket for receiving, and electrically communicating with, lamp 12
16 photosensor assembly for measuring intensity of lamp 12
18 body of socket 14 for receiving, and electrically communicating with, lamp 12
20 plurality of electrical contact pins of socket 14
22 lamp portion of plurality of electrical contact pins of socket 14 for electrically communicating with lamp 12
24 photosensor portion of plurality of electrical contact pins 20 of socket 14
26 electrical socket
28 lamp portion of electrical socket 26
30 photosensor portion of electrical socket 26
32 controller for electrically communicating with lamp 12
34 arm of photosensor assembly 16 for extending in direction of lamp 12
36 photosensor of photosensor assembly 16 for positioning at predetermined distance from lamp 12
38 terminal end of arm 34 of photosensor assembly 16
40 stiff wire of arm 34 of photosensor assembly 16
42 at least on finger of photosensor assembly for replaceably engaging lamp 12 to assure that photosensor 36 of photosensor assembly 16 is maintained at predetermined distance from lamp 12
44 feed back loop of controller 32 for electrically communicating with lamp 12

DETAILED DESCRIPTION OF THE PREFERRED EMBODIMENT

Referring now to the figures in which like numerals indicate like parts, and particularly to FIG. 1, which is a diagrammatic side elevational view of the combination socket and photosensor of the present invention measuring and adjusting intensity of a lamp in the socket, the combination socket and photosensor of the present invention is shown generally at 10 for measuring and adjusting intensity of a lamp 12 in the socket of the combination socket and photosensor 10.

The overall configuration of the combination socket and photosensor 10 can best be seen in FIG. 2, which is an enlarged diagrammatic side elevational view of the area generally enclosed by the dotted curve identified by ARROW 2 in FIG. 1 of the combination socket and photosensor of the present invention, and as such, will be discussed with reference thereto.

The combination socket and photosensor 10 comprises a socket 14 and a photosensor assembly 16. The socket 14 is for receiving, and electrically communicating with, the lamp 12. The photosensor assembly 16 is operatively connected to the socket 14 and is for measuring the intensity of the lamp 12.

The socket 14 has a body 18 and a plurality of contact pins 20. The body 18 of the socket 14 is for receiving, and electrically communicating with, the lamp 12. The plurality of electrical contact pins 20 of the socket 14 extend from the body 18 of the socket 14.

The plurality of electrical contact pins 20 of the socket 14 have a lamp portion 22 and a photosensor portion 24. The lamp portion 22 of the plurality of electrical contact pins 20 of the socket 14 are for electrically communicating with the lamp 12 and the photosensor portion 24 of the plurality of electrical contact pins 20 of the socket 14 electrically communicate with the photosensor assembly 16.

The combination socket and photosensor 10 further comprises an electrical socket 26. The electrical socket 26 electrically and replaceably receives the plurality of electrical contact pins 20 of the socket 14.

The electrical socket 26 has a lamp portion 28 and a photosensor portion 30. The lamp portion 28 of the electrical socket 26 electrically communicates with the lamp portion 22 of the plurality of electrical contact pins 20 of the socket 14 and the photosensor portion 30 of the electrical socket 26 electrically communicate with the photosensor portion 24 of the plurality of electrical contact pins 20 of the socket 14.

The combination socket and photosensor 10 further comprises a controller 32. The controller 32 electrically communicates with the electrical socket 26 and thereby is for electrically communicating with the lamp 12 and thereby electrically communicates with the photosensor assembly 16.

The photosensor assembly 16 comprises an arm 34 and a photosensor 36. The arm 34 of the photosensor assembly 16 extends from the body 18 of the socket 14 to a terminal end 38 and is for extending in a direction of the lamp 12. The photosensor 36 of the photosensor assembly 16 is disposed at the terminal end 38 of the arm 34 of the photosensor assembly 16, electrically communicates with the photosensor portion 24 of the plurality of electrical contact pins 20 of the socket 14, and is for positioning at a predetermined distance from the lamp 12. The arm 34 of the photosensor assembly 16 is preferably stiff wire 40.

The photosensor assembly 16 further comprises at least one finger 42. The at least on finger 42 of the photosensor assembly 16 is preferably spring wire, extends from the arm 34 of the photosensor assembly 16, and is for replaceably engaging the lamp 12 to assure that the photosensor 36 of the photosensor assembly 16 is maintained at the predetermined distance from the lamp 12.

The controller 32 contains a feed back loop 44. The feed back loop 44 of the controller 32 electrically communicates with the photosensor portion 30 of the electrical socket 26 and thereby electrically communicates with the photosensor 36 of the photosensor assembly 16 and electrically communicates with the lamp portion 28 of the electrical socket 26 and thereby is for electrically communicating with the lamp 12 and compares the intensity of the lamp 12 to a predetermined value and adjusts the intensity of the lamp 12 accordingly.

The invention claimed is:

1. A combination socket and photosensor for measuring and adjusting intensity of a lamp in said socket of said combination socket and photosensor, said combination comprising:
   a) a socket; and
   b) a photosensor assembly;
   wherein said socket is for receiving the lamp;
   wherein said socket is for electrically communicating with the lamp;
   wherein said photosensor assembly is operatively connected to said socket;
   wherein said photosensor assembly is for measuring the intensity of the lamp;
   wherein said socket has a body;
   wherein said photosensor assembly comprises an arm;
   wherein said photosensor assembly comprises a photosensor;
   wherein said arm of said photosensor assembly extends from said body of said socket to a terminal end;
   wherein said arm of said photosensor assembly is for extending in a direction of the lamp;
   wherein said photosensor of said photosensor assembly is disposed at said terminal end of said arm of said photosensor assembly;
   wherein said photosensor of said photosensor assembly electrically communicates with said photosensor portion of said plurality of electrical contact pins of said socket; and
   wherein said photosensor of said photosensor assembly is for positioning at a predetermined distance from the lamp.

2. The combination as defined in claim 1,
   wherein said socket has a plurality of contact pins;
   wherein said body of said socket is for receiving said lamp;
   wherein said body of said socket is for electrically communicating with said lamp; and
   wherein said plurality of electrical contact pins of said socket extend from said body of said socket.

3. The combination as defined in claim 2, wherein said plurality of electrical contact pins of said socket have a lamp portion;
   wherein said plurality of electrical contact pins of said socket have a photosensor portion;
   wherein said lamp portion of said plurality of electrical contact pins of said socket are for electrically communicating with the lamp; and
   wherein said photosensor portion of said plurality of electrical contact pins of said socket electrically communicate with said photosensor assembly.

4. The combination as defined in claim 3; further comprising an electrical socket;
   wherein said electrical socket electrically receives said plurality of electrical contact pins of said socket; and
   wherein said electrical socket replaceably receives said plurality of electrical contact pins of said socket.

5. The combination as defined in claim 4, wherein said electrical socket has a lamp portion; and
   wherein said electrical socket has a photosensor portion.

6. The combination as defined in claim 5, wherein said lamp portion of said electrical socket electrically communicates with said lamp portion of said plurality of electrical contact pins of said socket; and
   wherein said photosensor portion of said electrical socket electrically communicates with said photosensor portion of said plurality of electrical contact pins of said socket.

7. The combination as defined in claim 4; further comprising a controller; and
   wherein said controller electrically communicates with said electrical socket and thereby electrically communicates with said photosensor assembly and thereby is for electrically communicating with the lamp.

8. The combination as defined in claim 1, wherein said arm of said photosensor assembly is stiff wire.

9. The combination as defined in claim 1, wherein said photosensor assembly comprises at least one finger;
   wherein said at least on finger of said photosensor assembly extends from said arm of said photosensor assembly; and wherein said at least on finger of said photosensor assembly is for replaceably engaging the lamp to assure that said photosensor of said photosensor assembly is maintained at the predetermined distance from the lamp.

10. The combination as defined in claim 9, wherein said at least on finger of said photosensor assembly is spring wire.

11. The combination as defined in claim 1, wherein said controller contains a feed back loop;

wherein said feed back loop of said controller electrically communicates with said photosensor portion of said electrical socket and thereby electrically communicates with said photosensor of said photosensor assembly;

wherein said feed back loop of said controller electrically communicates with said lamp portion of said electrical socket and thereby is for electrically communicating with the lamp; and wherein said feed back loop of said controller compares the intensity of the lamp to a predetermined value and adjusts the intensity of the lamp accordingly.

* * * * *